(12) United States Patent
Stranberg

(10) Patent No.: US 11,618,208 B2
(45) Date of Patent: Apr. 4, 2023

(54) SYSTEM FOR ADDITIVELY MANUFACTURING COMPOSITE STRUCTURE

(71) Applicant: Continuous Composites Inc., Coeur d'Alene, ID (US)

(72) Inventor: Nathan Andrew Stranberg, Post Falls, ID (US)

(73) Assignee: Continuous Composites Inc., Coeur D'Alene, ID (US)

( * ) Notice: Subject to any disclaimer, the term of this patent is extended or adjusted under 35 U.S.C. 154(b) by 312 days.

(21) Appl. No.: 16/744,415

(22) Filed: Jan. 16, 2020

(65) Prior Publication Data

US 2020/0238609 A1 Jul. 30, 2020

Related U.S. Application Data

(60) Provisional application No. 62/797,078, filed on Jan. 25, 2019.

(51) Int. Cl.
*B29C 64/118* (2017.01)
*B29C 64/188* (2017.01)
(Continued)

(52) U.S. Cl.
CPC .......... *B29C 64/118* (2017.08); *B29C 64/106* (2017.08); *B29C 64/165* (2017.08);
(Continued)

(58) Field of Classification Search
None
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — S. Behrooz Ghorishi
(74) *Attorney, Agent, or Firm* — Ryan C. Stockett

(57) ABSTRACT

An additive manufacturing system is disclosed for use in discharging a continuous reinforcement. The additive manufacturing system may include a support, and a compactor operatively connected to and movable by the support. The compactor may be configured to apply a pressure to the continuous reinforcement during discharge. The additive manufacturing system may also include a feed roller biased toward the compactor to sandwich the continuous reinforcement between the roller and the compactor, and a cutting mechanism at least partially recessed within at least one of the feed roller and the compactor. The cutting mechanism may be configured to selectively move radially outward to engage the continuous reinforcement.

20 Claims, 3 Drawing Sheets

(51) Int. Cl.

| | | |
|---|---|---|
| *B29C 64/218* | (2017.01) | |
| *B29C 64/241* | (2017.01) | |
| *B29C 64/264* | (2017.01) | |
| *B29C 64/314* | (2017.01) | |
| *B29C 64/209* | (2017.01) | |
| *B29C 64/393* | (2017.01) | |
| *B29C 64/165* | (2017.01) | |
| *G06F 30/23* | (2020.01) | |
| *B29C 64/227* | (2017.01) | |
| *B29C 64/106* | (2017.01) | |
| *B29C 64/245* | (2017.01) | |
| *B29C 64/295* | (2017.01) | |
| *B33Y 40/00* | (2020.01) | |
| *B33Y 10/00* | (2015.01) | |
| *B33Y 30/00* | (2015.01) | |
| *B33Y 50/02* | (2015.01) | |
| *G06F 113/10* | (2020.01) | |
| *B33Y 70/10* | (2020.01) | |
| *B29K 105/08* | (2006.01) | |

(52) U.S. Cl.
CPC .......... *B29C 64/188* (2017.08); *B29C 64/209* (2017.08); *B29C 64/218* (2017.08); *B29C 64/227* (2017.08); *B29C 64/241* (2017.08); *B29C 64/245* (2017.08); *B29C 64/264* (2017.08); *B29C 64/295* (2017.08); *B29C 64/314* (2017.08); *B29C 64/393* (2017.08); *G06F 30/23* (2020.01); *B29K 2105/08* (2013.01); *B33Y 10/00* (2014.12); *B33Y 30/00* (2014.12); *B33Y 40/00* (2014.12); *B33Y 50/02* (2014.12); *B33Y 70/10* (2020.01); *G06F 2113/10* (2020.01)

(56) References Cited

U.S. PATENT DOCUMENTS

| | | | |
|---|---|---|---|
| 3,984,271 A | | 10/1976 | Gilbu |
| 3,993,726 A | | 11/1976 | Moyer |
| 4,508,584 A | * | 4/1985 | Charles ................ B29C 70/388 156/353 |
| 4,643,940 A | | 2/1987 | Shaw et al. |
| 4,671,761 A | | 6/1987 | Adrian et al. |
| 4,822,548 A | | 4/1989 | Hempel |
| 4,851,065 A | | 7/1989 | Curtz |
| 5,002,712 A | | 3/1991 | Goldmann et al. |
| 5,037,691 A | | 8/1991 | Medney et al. |
| 5,296,335 A | | 3/1994 | Thomas et al. |
| 5,340,433 A | | 8/1994 | Crump |
| 5,580,413 A | * | 12/1996 | Assink ................ B29C 70/388 156/361 |
| 5,746,967 A | | 5/1998 | Hoy et al. |
| 5,866,058 A | | 2/1999 | Batchelder et al. |
| 5,936,861 A | | 8/1999 | Jang et al. |
| 6,153,034 A | | 11/2000 | Lipsker |
| 6,459,069 B1 | | 10/2002 | Rabinovich |
| 6,501,554 B1 | | 12/2002 | Hackney et al. |
| 6,799,081 B1 | | 9/2004 | Hale et al. |
| 6,803,003 B2 | | 10/2004 | Rigali et al. |
| 6,934,600 B2 | | 8/2005 | Jang et al. |
| 7,039,485 B2 | | 5/2006 | Engelbart et al. |
| 7,555,404 B2 | | 6/2009 | Brennan et al. |
| 7,795,349 B2 | | 9/2010 | Bredt et al. |
| 8,221,669 B2 | | 7/2012 | Batchelder et al. |
| 8,962,717 B2 | | 2/2015 | Roth et al. |
| 9,126,365 B1 | | 9/2015 | Mark et al. |
| 9,126,367 B1 | | 9/2015 | Mark et al. |
| 9,149,988 B2 | | 10/2015 | Mark et al. |
| 9,156,205 B2 | | 10/2015 | Mark et al. |
| 9,186,846 B1 | | 11/2015 | Mark et al. |
| 9,186,848 B2 | | 11/2015 | Mark et al. |
| 9,327,452 B2 | | 5/2016 | Mark et al. |
| 9,327,453 B2 | | 5/2016 | Mark et al. |
| 9,370,896 B2 | | 6/2016 | Mark |
| 9,381,702 B2 | | 7/2016 | Hollander |
| 9,457,521 B2 | | 10/2016 | Johnston et al. |
| 9,458,955 B2 | | 10/2016 | Hammer et al. |
| 9,527,248 B2 | | 12/2016 | Hollander |
| 9,539,762 B2 | | 1/2017 | Durand et al. |
| 9,579,851 B2 | | 2/2017 | Mark et al. |
| 9,688,028 B2 | | 6/2017 | Mark et al. |
| 9,694,544 B2 | | 7/2017 | Mark et al. |
| 9,764,378 B2 | | 9/2017 | Peters et al. |
| 9,770,876 B2 | | 9/2017 | Farmer et al. |
| 9,782,926 B2 | | 10/2017 | Witzel et al. |
| 2002/0009935 A1 | | 1/2002 | Hsiao et al. |
| 2002/0062909 A1 | | 5/2002 | Jang et al. |
| 2002/0113331 A1 | | 8/2002 | Zhang et al. |
| 2002/0165304 A1 | | 11/2002 | Mulligan et al. |
| 2003/0044539 A1 | | 3/2003 | Oswald |
| 2003/0056870 A1 | | 3/2003 | Comb et al. |
| 2003/0160970 A1 | | 8/2003 | Basu et al. |
| 2003/0186042 A1 | | 10/2003 | Dunlap et al. |
| 2003/0236588 A1 | | 12/2003 | Jang et al. |
| 2005/0006803 A1 | | 1/2005 | Owens |
| 2005/0061422 A1 | | 3/2005 | Martin |
| 2005/0104257 A1 | | 5/2005 | Gu et al. |
| 2005/0109451 A1 | | 5/2005 | Hauber et al. |
| 2005/0230029 A1 | | 10/2005 | Vaidyanathan et al. |
| 2007/0003650 A1 | | 1/2007 | Schroeder |
| 2007/0228592 A1 | | 10/2007 | Dunn et al. |
| 2008/0176092 A1 | | 7/2008 | Owens |
| 2009/0095410 A1 | | 4/2009 | Oldani |
| 2010/0230043 A1 | * | 9/2010 | Kisch ................ B29C 70/388 156/265 |
| 2011/0032301 A1 | | 2/2011 | Fienup et al. |
| 2011/0143108 A1 | | 6/2011 | Fruth et al. |
| 2012/0060468 A1 | | 3/2012 | Dushku et al. |
| 2012/0159785 A1 | | 6/2012 | Pyles et al. |
| 2012/0231225 A1 | | 9/2012 | Mikulak et al. |
| 2012/0247655 A1 | | 10/2012 | Erb et al. |
| 2013/0164498 A1 | | 6/2013 | Langone et al. |
| 2013/0209600 A1 | | 8/2013 | Tow |
| 2013/0233471 A1 | | 9/2013 | Kappesser et al. |
| 2013/0292039 A1 | | 11/2013 | Peters et al. |
| 2013/0337256 A1 | | 12/2013 | Farmer et al. |
| 2013/0337265 A1 | | 12/2013 | Farmer |
| 2014/0034214 A1 | | 2/2014 | Boyer et al. |
| 2014/0061974 A1 | | 3/2014 | Tyler |
| 2014/0159284 A1 | | 6/2014 | Leavitt |
| 2014/0232035 A1 | | 8/2014 | Bheda |
| 2014/0268604 A1 | | 9/2014 | Wicker et al. |
| 2014/0291886 A1 | | 10/2014 | Mark et al. |
| 2015/0136455 A1 | | 5/2015 | Fleming |
| 2015/0314522 A1 | * | 11/2015 | Witzel ................ B29B 11/16 156/166 |
| 2015/0328876 A1 | * | 11/2015 | Nishimura ............ B32B 41/00 156/64 |
| 2016/0012935 A1 | | 1/2016 | Rothfuss |
| 2016/0031155 A1 | | 2/2016 | Tyler |
| 2016/0046082 A1 | * | 2/2016 | Fuerstenberg .......... B29C 70/30 264/480 |
| 2016/0052208 A1 | | 2/2016 | Debora et al. |
| 2016/0082641 A1 | | 3/2016 | Bogucki et al. |
| 2016/0082659 A1 | | 3/2016 | Hickman et al. |
| 2016/0107379 A1 | | 4/2016 | Mark et al. |
| 2016/0114532 A1 | | 4/2016 | Schirtzinger et al. |
| 2016/0136885 A1 | | 5/2016 | Nielsen-Cole et al. |
| 2016/0144565 A1 | | 5/2016 | Mark et al. |
| 2016/0144566 A1 | | 5/2016 | Mark et al. |
| 2016/0192741 A1 | | 7/2016 | Mark |
| 2016/0200047 A1 | | 7/2016 | Mark et al. |
| 2016/0243762 A1 | | 8/2016 | Fleming et al. |
| 2016/0263806 A1 | | 9/2016 | Gardiner |
| 2016/0263822 A1 | | 9/2016 | Boyd |
| 2016/0263823 A1 | | 9/2016 | Espiau et al. |
| 2016/0271876 A1 | | 9/2016 | Lower |
| 2016/0297104 A1 | | 10/2016 | Guillemette et al. |
| 2016/0311165 A1 | | 10/2016 | Mark et al. |
| 2016/0325491 A1 | | 11/2016 | Sweeney et al. |
| 2016/0332369 A1 | | 11/2016 | Shah et al. |

(56) References Cited

U.S. PATENT DOCUMENTS

| | | |
|---|---|---|
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

SYSTEM FOR ADDITIVELY MANUFACTURING COMPOSITE STRUCTURE

RELATED APPLICATION

This application is based on and claims the benefit of priority from U.S. Provisional Application No. 62/797,078 that was filed on Jan. 25, 2019, the contents of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D® provides for increased strength, compared to manufacturing processes that do not utilize continuous fiber reinforcement, improvements can be made to the structure and/or operation of existing systems. For example, Applicant has found that greater control over feeding and cutting of the reinforcement can improve reinforcement placement and system reliability. The disclosed additive manufacturing system is uniquely configured to provide these improvements and/or to address other issues of the prior art.

SUMMARY

In one aspect, the present disclosure is directed to an additive manufacturing system for use in discharging a continuous reinforcement. The additive manufacturing system may include a support, and a compactor operatively connected to and movable by the support. The compactor may be configured to apply a pressure to the continuous reinforcement during discharge. The additive manufacturing system may also include a feed roller biased toward the compactor to sandwich the continuous reinforcement between the roller and the compactor, and a cutting mechanism at least partially recessed within at least one of the feed roller and the compactor. The cutting mechanism may be configured to selectively move radially outward to engage the continuous reinforcement.

In another aspect, the present disclosure is directed to a method of additively manufacturing a structure. The method may include discharging through an outlet a continuous reinforcement, moving the outlet during discharging, and pressing a compactor against the continuous reinforcement during discharging. The method may also include sandwiching the continuous reinforcement between the compactor and a feed roller, and selectively pushing a cutting mechanism radially outward through a surface of at least one of the compactor and the feed roller to engage the continuous reinforcement.

DETAILED DESCRIPTION

Figure 1:
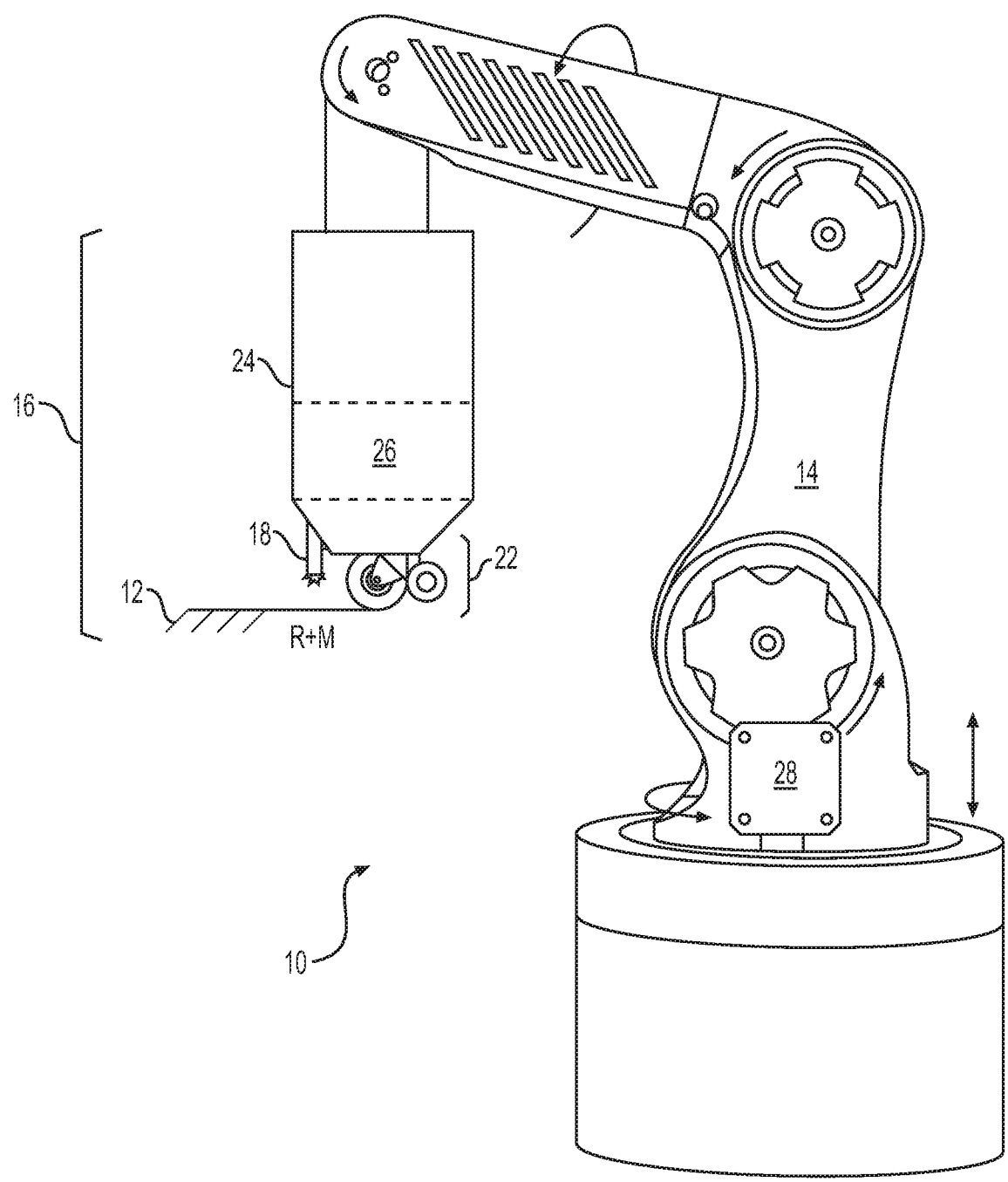
FIG. 1 is a diagrammatic illustration of an exemplary disclosed additive manufacturing system.

FIG. 1 illustrates an exemplary system 10, which may be used to manufacture a composite structure 12 having any desired shape. System 10 may include a support 14 and deposition head ("head") 16. Head 16 may be coupled to and moved by support 14. In the disclosed embodiment of FIG. 1, support 14 is a robotic arm capable of moving head 16 in multiple directions during fabrication of structure 12. Support 14 may alternatively embody a gantry (e.g., an over-head-bridge or single-post gantry) or a hybrid gantry/arm also capable of moving head 16 in multiple directions during fabrication of structure 12. Although support 14 is shown as being capable of 6-axis movements, it is contemplated that support 14 may be capable of moving head 16 in a different manner (e.g., along or around a greater or lesser number of axes). In some embodiments, a drive may mechanically couple head 16 to support 14, and include components that cooperate to move portions of and/or supply power or materials to head 16.

Head 16 may be configured to receive or otherwise contain a matrix (shown as M). The matrix may include any types or combinations of materials (e.g., a liquid resin, such as a zero-volatile organic compound resin, a powdered metal, etc.) that are curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized (e.g., positively and/or negatively), for example by an external device (e.g., by an extruder, a pump, etc.—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16, and pushed or pulled out of head 16 along with one or more continuous reinforcements (shown as R). In some instances, the matrix inside head 16 may need to be kept cool and/or dark in order to inhibit premature curing or otherwise obtain a desired rate of curing after discharge. In other instances, the matrix may need to be kept warm and/or illuminated for similar reasons. In either situation, head 16 may be specially configured (e.g., insulated, temperature-controlled, shielded, etc.) to provide for these needs.

The matrix may be used to at least partially coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 16.

When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, plastic fibers, metallic fibers, optical fibers (e.g., tubes), etc. It should be noted that the term "reinforcement" is meant to encompass both structural and non-structural (e.g., functional) types of continuous materials that are at least partially encased in the matrix discharging from head 16.

The reinforcements may be at least partially coated with the matrix while the reinforcements are inside head 16, while the reinforcements are being passed to head 16, and/or while the reinforcements are discharging from head 16. The matrix, dry (e.g., unimpregnated) reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers, nano particles or tubes, etc.) and/or additives (e.g., thermal initiators, UV initiators, etc.) may be mixed with the matrix before and/or after the matrix coats the continuous reinforcements.

One or more cure enhancers (e.g., a UV light, an ultrasonic emitter, a laser, a heater, a catalyst dispenser, etc.) 18 may be mounted proximate (e.g., within, on, and/or adjacent) head 16 and configured to enhance a cure rate and/or quality of the matrix as it is discharged from head 16. Cure enhancer 18 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, solidify the material, polymerize the material, or otherwise cause the matrix to cure as it discharges from head 16. The amount of energy produced by cure enhancer 18 may be sufficient to cure the matrix before structure 12 axially grows more than a predetermined length away from head 16. In one embodiment, structure 12 is completely cured before the axial growth length becomes equal to an external diameter of the matrix-coated reinforcement.

The matrix and/or reinforcement may be discharged from head 16 via any number of different modes of operation. In a first example mode of operation, the matrix and/or reinforcement are extruded (e.g., pushed under pressure and/or mechanical force) from head 16 as head 16 is moved by support 14 to create features of structure 12. In a second example mode of operation, at least the reinforcement is pulled from head 16, such that a tensile stress is created in the reinforcement during discharge. In this second mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor point (e.g., a print bed, an existing surface of structure 12, a fixture, etc.). In particular, at the start of structure formation, a length of matrix-impregnated reinforcement may be pulled and/or pushed from head 16, deposited onto the anchor point, and at least partially cured, such that the discharged material adheres (or is otherwise coupled) to the anchor point. Thereafter, head 16 may be moved away from the anchor point, and the relative movement may cause the reinforcement to be pulled from head 16. As will be explained in more detail below, the movement of reinforcement through head 16 may be selectively assisted via one or more internal feed mechanisms, if desired. However, the discharge rate of reinforcement from head 16 may primarily be the result of relative movement between head 16 and the anchor point, such that tension is created within the reinforcement. As discussed above, the anchor point could be moved away from head 16 instead of or in addition to head 16 being moved away from the anchor point.

Head 16 may include, among other things, an outlet 22 and a matrix reservoir 24 located upstream of outlet 22. In one example, outlet 22 is a single-channel outlet configured to discharge composite material having a generally circular, tubular, or rectangular cross-section. The configuration of head 16, however, may allow outlet 22 to be swapped out for another outlet that discharges multiple channels of composite material having different shapes (e.g., a flat or sheet-like cross-section, a multi-track cross-section, etc.). Fibers, tubes, and/or other reinforcements may pass through matrix reservoir 24 (e.g., through one or more internal wetting mechanisms 26 located inside of reservoir 24) and be wetted (e.g., at least partially coated and/or fully saturated) with matrix prior to discharge.

A controller 28 may be provided and communicatively coupled with support 14 and head 16. Each controller 28 may embody a single processor or multiple processors that are programmed and/or otherwise configured to control an operation of system 10. Controller 28 may include one or more general or special purpose processors or microprocessors. Controller 28 may further include or be associated with a memory for storing data such as, for example, design limits, performance characteristics, operational instructions, tool paths, and corresponding parameters of each component of system 10. Various other known circuits may be associated with controller 28, including power supply circuitry, signal-conditioning circuitry, solenoid driver circuitry, communication circuitry, and other appropriate circuitry. Moreover, controller 28 may be capable of communicating with other components of system 10 via wired and/or wireless transmission.

One or more maps may be stored within the memory of controller 28 and used during fabrication of structure 12. Each of these maps may include a collection of data in the form of lookup tables, graphs, and/or equations. In the disclosed embodiment, the maps may be used by controller 28 to determine movements of head 16 required to produce desired geometry (e.g., size, shape, material composition, performance parameters, and/or contour) of structure 12, and to regulate operation of cure enhancer(s) 18 and/or other related components in coordination with the movements.

Figure 2:
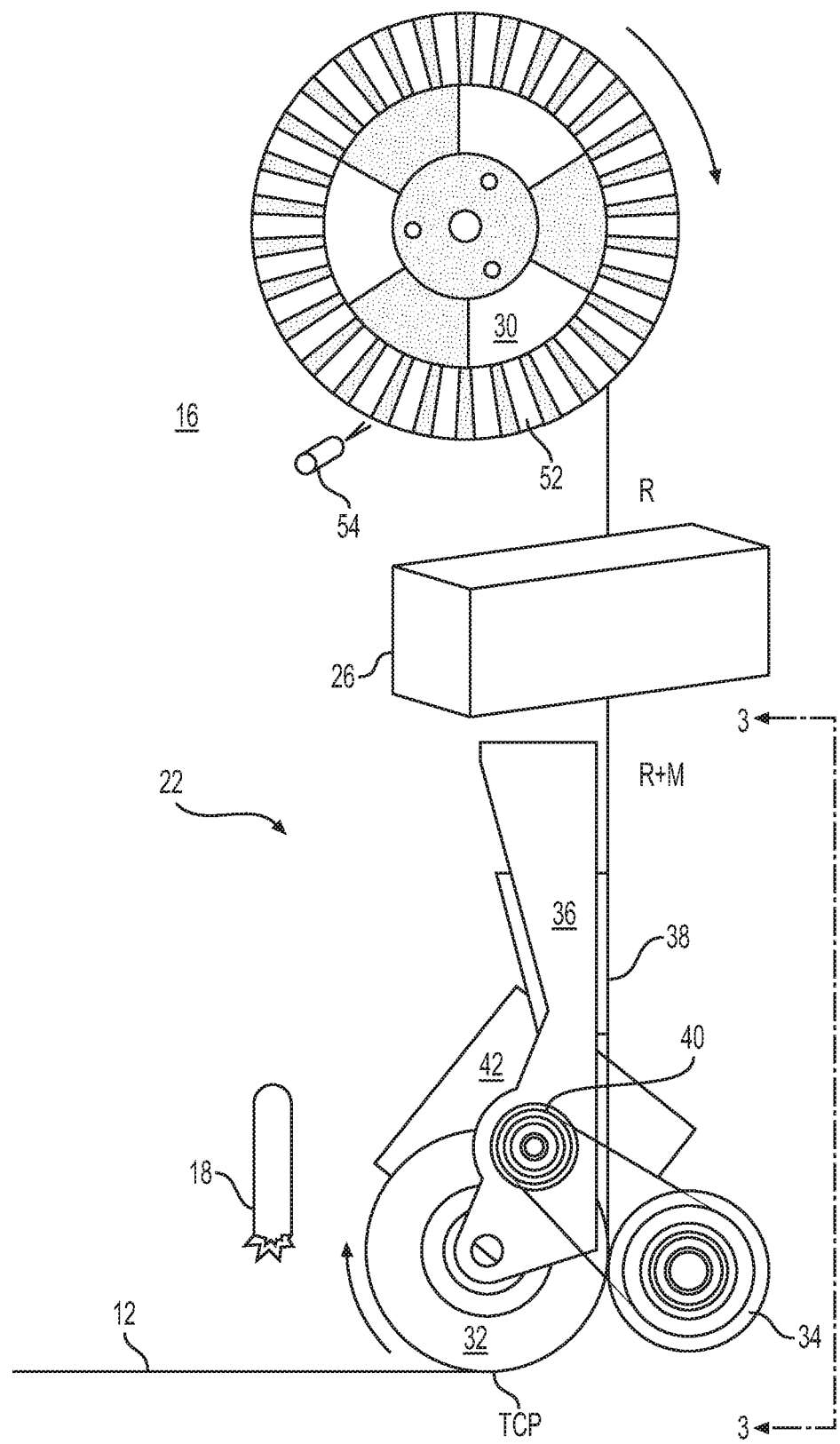
FIGS. 2 and 3 are diagrammatic illustrations of exemplary disclosed portions of the system of FIG. 1.

FIG. 2 illustrates a diagrammatic illustration of head 16, wherein a housing of reservoir 24 has been removed for clarity. As can be seen in this figure, the reinforcement R may be pulled from a supply (e.g., an internal and/or external creel or spool) 30, passed through and at least partially wetted with the matrix M by mechanism 26, and then discharged through outlet 22.

Figure 3:
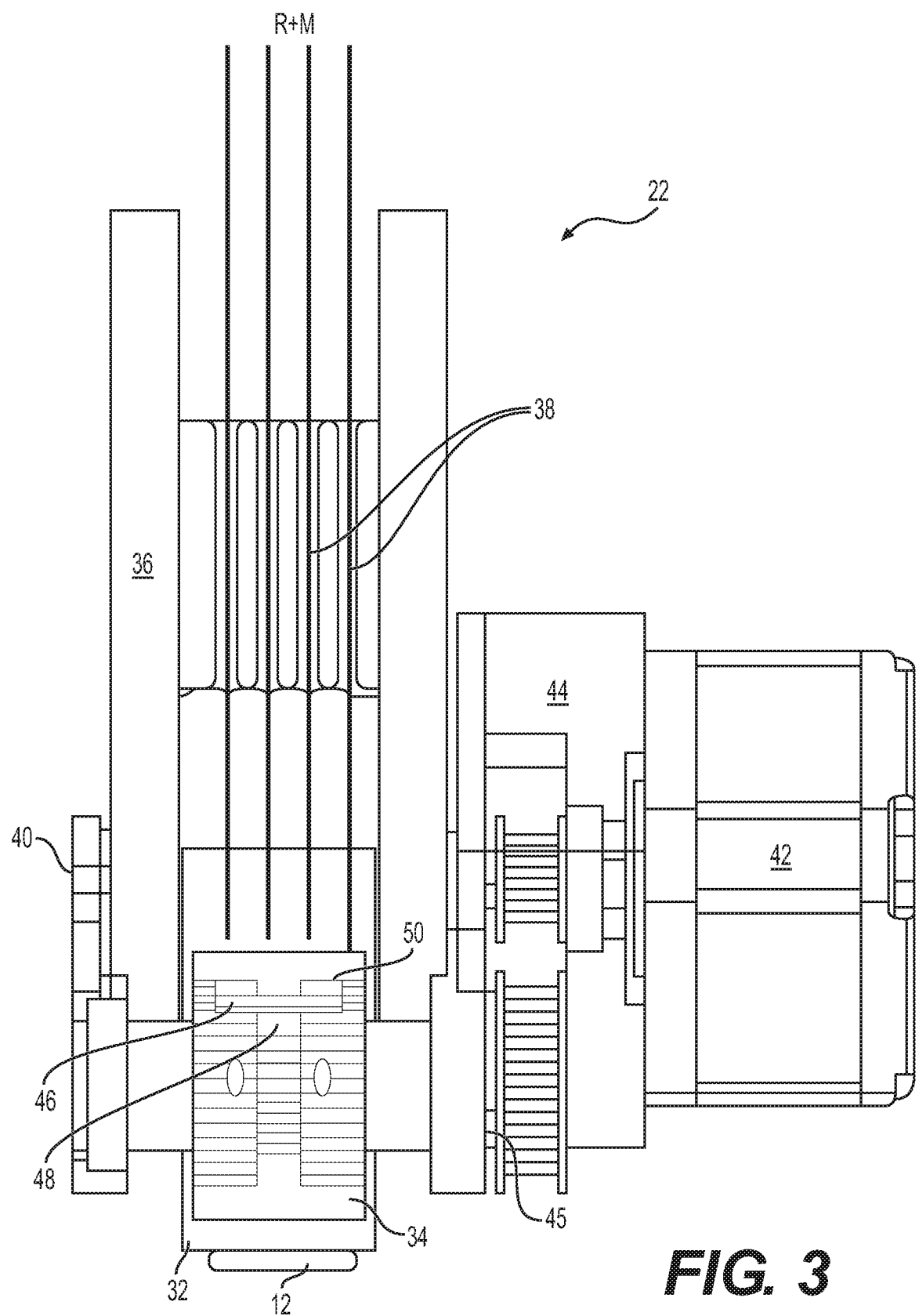

As can be shown in FIGS. 2 and 3, outlet 22 may be an assembly of components that cooperate to accurately place the matrix-wetted reinforcement(s) and thereby form structure 12. These components may include, among other things, a compactor 32 that functions as a tool center point (TCP) of head 16, a feed roller 34 that selectively engages compactor 32, and a guide 36 located upstream of compactor 32 and feed roller 34. During discharge of material from head 16, the matrix-wetted reinforcements may pass through one or more features (e.g., channels, grooves, protrusions, etc.) 38 of guide 36 that help to maintain desired trajectories (e.g., separation between adjacent reinforcements and/or straightness) of the reinforcements, and then between compactor 32 and feed roller 34. Compactor 32 may be configured to press the matrix-wetted reinforcement against an underlying surface, while feed roller 34 may function to selectively or continuously feed reinforcement to compactor 32.

In one embodiment, feed roller 34 may be biased toward compactor 32 (e.g., via a spring 40), such that the reinforcements are sandwiched therebetween. In addition, feed roller 34 may be selectively driven (e.g., via a motor 42) to cause corresponding rotation of compactor 32 and/or to push and/or pull the sandwiched reinforcements through outlet 22. For example, motor 42 may be operatively connected to feed roller 34 by way of a gear train 44 and/or an overrunning clutch 45. As motor 42 is selectively energized by controller 28 to rotate feed roller 34, the surface engagement of feed roller 34 with compactor 32 (e.g., caused by the bias of spring 40) may result in compactor 32 being frictionally driven at a corresponding angular velocity. With this configuration, less (if any) tension may be generated within the reinforcement at locations downstream of outlet 22 than would otherwise be generated by the movement of head 16 away from the anchor point. This may produce more accurate and/or equal levels of tension within each reinforcement. Clutch 45 may allow the reinforcements to still be pulled through outlet 22, when a speed of head 16 away from the anchor point is greater than a speed of feed roller 34. It is contemplated that compactor 32 could be driven independently of feed roller 34, if desired.

As shown in FIG. 3, a cutting mechanism 46 may be integrated into feed roller 34, in some embodiments. In this example, cutting mechanism 46 embodies a blade that is normally recessed below an outer surface of feed roller 34, such that the blade does not engage the reinforcements during normal discharge. At select timings, the blade may be pushed radially outward to protrude through the outer surface of feed roller 34, allowing the rotation of feed roller 34 to force the blade through the reinforcements and against a compliant outer surface of compactor 32. It is contemplated that compactor 32 may require periodic replacement and/or that a replaceable sleeve may be positioned over compactor 32 to ensure that a desired surface texture of the deposited material is maintained.

In another embodiment, a surface of feed roller 34 may be compliant, such that engagement of feed roller 34 with compactor 32 exposes the blade of cutting mechanism 46 to the reinforcement. This may occur with or without any radial movement of the blade. In one example, the compliant portion of feed roller 34 could be pressurized to varying levels to affect selective exposure of the blade. For example, a first pressure may inhibit exposure during a feeding event, and a lower second pressure may allow deflection of the compliant portion and exposure of the blade.

In one example, the blade of cutting mechanism 46 may be pushed radially outward by fluid pressure. For example, an internal bladder or piston 48 may be selectively filled and drained of pressurized air, oil, or another medium to force the blade to outward (e.g., within side-located guides 50) or retracted, as needed. It is contemplated that cutting mechanism 46 could alternatively or additionally be located within compactor 32, if desired.

In another example, the blade of cutting mechanism 46 may permanently protrude from feed roller 34. In this embodiment, feed roller 34 may be selectively engaged with compactor 32, for example only when cutting is desired.

It can be important, in some applications, to ensure that severing of the reinforcement by cutting mechanism 46 has been completed successfully, before subsequent operations are initiated. An exemplary arrangement that provides this confirmation is illustrated in FIG. 2. As seen in this figure, an indexing wheel 52 has been affixed to and/or integrated into reinforcement supply 30, and a sensor 54 has been placed in proximity to indexing wheel 52. Sensor 54 may be configured to generate signals directed to controller 28 that are indicative of reinforcement payout (e.g., of rotation of indexing wheel 52). Controller 28 may utilize the signals to determine if reinforcement is being pulled from head 16 at a time when no reinforcement should be discharging from outlet 22. For example, after severing of the reinforcement by cutting mechanism 46 and during movement and/or restart of a new track of material, the reinforcement should not be paying out from supply 30 or discharging from outlet 22. However, if the reinforcement was not successfully severed and head 16 attempts to move away from the severing location, the remaining attachment to structure 12 might cause the reinforcement to be inadvertently pulled from head 16. Sensor 54 may generate signals indicative of this undesired payout, and controller 28 may respond in any number of different ways. For example, controller 28 may cause movement of head 16 to halt (e.g., via corresponding signals directed to support 14—referring to FIG. 1), generate an error flag, shut down system 10, cause cutting mechanism 46 to reattempt severing of the reinforcement, and/or implement another corrective action.

INDUSTRIAL APPLICABILITY

The disclosed system may be used to manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 28 that is responsible for regulating operations of support 14 and/or head 16). This information may include, among other things, a size (e.g., diameter, wall thickness, length, etc.), a contour (e.g., a trajectories, surface normal, etc.), surface features (e.g., ridge size, location, thickness, length; flange size, location, thickness, length; etc.), connection geometry (e.g., locations and sizes of couplings, tees, splices, etc.), reinforcement selection, matrix selection, discharge locations, severing locations, etc. It should be noted that this information may alternatively or additionally be loaded into system 10 at different times and/or continuously during the manufacturing event, if desired. Based on the component information, one or more different reinforcements and/or matrix materials may be installed and/or continuously supplied into system 10.

To install the reinforcements, individual fibers, tows, and/or ribbons may be passed through matrix reservoir 24 and outlet 22 (e.g., through features 38 of guide 36, and between compactor 32 and feed roller 34). In some embodiments, the reinforcements may also need to be connected to a pulling machine (not shown) and/or to a mounting fixture (e.g., to the anchor point). Installation of the matrix material may include filling head 16 (e.g., wetting mechanism 26 of reservoir 24) and/or coupling of an extruder (not shown) to head 16.

The component information may then be used to control operation of system 10. For example, the in-situ wetted reinforcements may be pulled and/or pushed from outlet 22 of head 16 as support 14 selectively moves (e.g., based on known kinematics of support 14 and/or known geometry of structure 12), such that the resulting structure 12 is fabricated as desired.

Operating parameters of support 14, cure enhancer(s) 18, compactor 32, feed roller 34, motor 42, cutting mechanism 46, and/or other components of system 10 may be adjusted in real time during material discharge to provide for desired bonding, strength, tension, geometry, and other characteristics of structure 12. Once structure 12 has grown to a desired length, structure 12 may be severed from system 10.

It will be apparent to those skilled in the art that various modifications and variations can be made to the disclosed system. Other embodiments will be apparent to those skilled in the art from consideration of the specification and practice of the disclosed system. For example, it is contemplated that a tensioner (not shown) may be associated with supply 30 or otherwise disposed between supply 30 and guide 36 to help maintain desired levels of tension within the reinforcements being passed from supply 30 to compactor 32. It is intended that the specification and examples be considered as exemplary only, with a true scope being indicated by the following claims and their equivalents.

What is claimed is:

1. An additive manufacturing system configured to discharge a continuous reinforcement, comprising:
   a support;
   a compactor operatively connected to and movable by the support, the compactor being configured to apply a pressure to the continuous reinforcement during discharge;
   a feed mechanism configured to translate toward and away from the compactor to selectively feed the continuous reinforcement during discharge; and
   a cutting mechanism disposed between the feed mechanism and the compactor, the cutting mechanism being configured to:
      engage the continuous reinforcement to selectively sever the continuous reinforcement into a first section and a second section, the first section being located upstream of the cutting mechanism and the second section being located downstream of the cutting mechanism, and
      disengage the continuous reinforcement during feeding of the first section via the feed mechanism.

2. The additive manufacturing system of claim 1, further including:
   a first actuator operatively connected to the cutting mechanism;
   a second actuator operatively connected to the feed mechanism.

3. The additive manufacturing system of claim 1, further including a wetting mechanism located upstream of the compactor, the wetting mechanism being configured to at least partially wet the continuous reinforcement with a liquid matrix.

4. The additive manufacturing system of claim 3, further including a supply of the continuous reinforcement located upstream of the wetting mechanism.

5. The additive manufacturing system of claim 4, further including:
   a sensor configured to generate a signal indicative of a payout of the supply; and
   a controller in communication with the sensor and the cutting mechanism, the controller being configured to selectively affect at least one of a movement of the support or a severing attempt by the cutting mechanism based at least in part on the signal.

6. The additive manufacturing system of claim 4, further including a cure enhancer configured to expose the liquid matrix to cure energy at least one of during or after application of the pressure by the compactor.

7. The additive manufacturing system of claim 4, further including a guide disposed between the supply and the compactor, the guide having a plurality of features that separately direct reinforcements from the supply to the compactor.

8. The additive manufacturing system of claim 1, wherein the feed mechanism is movably connected to the compactor.

9. The additive manufacturing system of claim 1, wherein the feed mechanism is located closer to the compactor during engagement with the continuous reinforcement than during disengagement with the first section of the continuous reinforcement.

10. A print head, comprising:
    a cutting mechanism configured to cut a continuous reinforcement into a first portion that is located upstream of the cutting mechanism and a second portion that is located downstream of the cutting mechanism;
    a discharging end configured to discharge the second portion of the continuous reinforcement at least partially coated in a liquid matrix;
    a compactor configured to compact the second portion of the continuous reinforcement during discharge from the discharging end; and
    a feed mechanism configured to selectively push the first portion of the continuous reinforcement to the compactor, the feed mechanism being configured to translate:
       in a first direction towards the compactor during an engagement with the first portion of the continuous reinforcement; and
       in a second direction away from the compactor during a disengagement with the first portion of the continuous reinforcement.

11. The print head of claim 10, further comprising a cure enhancer, the cure enhancer being located prior to the compactor or after the compactor, relative to a direction of movement of the continuous reinforcement through the print head.

12. The print head of claim 10, wherein the cutting mechanism is located between the feed mechanism and the compactor.

13. The print head of claim 12, wherein the cutting mechanism is configured to translate in a third direction to cut the continuous reinforcement, the third direction being different than the first direction and the second direction.

14. The print head of claim 10, further comprising an actuator, the actuator being configured to actuate the cutting mechanism to cut the continuous reinforcement.

15. The print head of claim 10, further comprising:
   a spool about which the continuous reinforcement is wound;
   a sensor configured to generate signals indicative of a movement of the spool; and
   a controller in communication with the sensor and the cutting mechanism, the controller being configured to:
      receive, at a first instance, a first signal indicative of the cutting mechanism cutting the continuous reinforcement;
      receive, at a second instance after the first instance, a second signal indicative of the movement of the spool; and
      cause, based at least in part on the second signal, at least one of:
         the print head to stop moving, or
         the cutting mechanism to cut the continuous reinforcement.

16. The print head of claim 10, further comprising an actuator, wherein the actuator is configured to move the feed mechanism in the first direction towards the compactor and in the second direction away from the compactor.

17. The print head of claim 10, further comprising a controller in communication with the feed mechanism, wherein the controller is configured to cause the feed mechanism to move:
   in the first direction towards the compactor; and
   in the second direction away from the compactor.

18. The print head of claim 10, further comprising a wetting mechanism located upstream of the compactor, relative to a direction of movement of the continuous reinforcement through the print head, the wetting mechanism being configured to at least partially wet the continuous reinforcement with the liquid matrix.

19. The print head of claim 10, wherein:
   the print head is configured to connect to a support; and
   the print head is movable by the support.

20. The print head of claim 10, further including a guide configured to direct the first portion of the continuous reinforcement to the compactor, the feed mechanism being operably connected to the guide.

\* \* \* \* \*